(12) United States Patent
Typaldos (10) Patent No.: US 6,332,173 B2
(45) Date of Patent: *Dec. 18, 2001

(54) UART AUTOMATIC PARITY SUPPORT FOR FRAMES WITH ADDRESS BITS

(75) Inventor: Melanie D. Typaldos, Buda, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,945

(22) Filed: Oct. 31, 1998

(51) Int. Cl.[7] .............................. G06F 1/32; G06F 3/00; G06F 13/38; G06F 13/10; G06F 13/00
(52) U.S. Cl. .......................... 710/106; 710/105; 710/30; 710/61; 713/322
(58) Field of Search ................................. 710/52, 22, 26, 710/30, 61, 105, 106; 713/322; 714/6, 800, 769, 805, 52, 53, 45; 709/250; 370/62, 463, 282, 469; 235/492; 365/189.01

(56) References Cited

U.S. PATENT DOCUMENTS

| | | | |
|---|---|---|---|
| Re. 31,814 * | 1/1985 | Lubin | 370/62 |
| 3,618,037 * | 11/1971 | Wollum et al. | 713/502 |
| 3,940,563 * | 2/1976 | Susset | 179/15 BS |
| 4,453,228 * | 6/1984 | Loskorn | 710/106 |
| 4,862,480 * | 8/1989 | Gupta | 375/259 |
| 4,907,225 * | 3/1990 | Gulick et al. | 370/463 |
| 4,949,333 * | 8/1990 | Gulick et al. | 370/282 |
| 5,043,943 * | 8/1991 | Crisp et al. | 365/189.01 |
| 5,117,428 * | 5/1992 | Jeppesen, III et al. | 714/45 |
| 5,123,091 * | 6/1992 | Newman | 710/30 |
| 5,140,679 * | 8/1992 | Michael | 710/106 |
| 5,173,683 | 12/1992 | Brighenti et al. | 340/505 |
| 5,187,708 * | 2/1993 | Nakatani et al. | 370/469 |
| 5,192,947 | 3/1993 | Neustein | 340/7.63 |
| 5,263,054 | 11/1993 | Davis et al. | 375/340 |
| 5,345,582 * | 9/1994 | Tsuchiya | 714/53 |
| 5,357,249 * | 10/1994 | Azaren et al. | 341/100 |

(List continued on next page.)

FOREIGN PATENT DOCUMENTS

| | | | | |
|---|---|---|---|---|
| 3610523A1 | * | 10/1987 | (DE) | 375/355 |
| 0120172A1 | * | 10/1984 | (EP) | G06F/3/04 |
| 0257405A1 | * | 3/1988 | (EP) | G06F/11/10 |
| 0311448A2 | * | 4/1989 | (EP) | H04J/3/07 |
| 0339305A2 | * | 11/1989 | (EP) | G06F/11/10 |
| 0830679B1 | * | 10/1999 | (EP) | G11B/21/08 |
| 07023013A | * | 1/1995 | (JP) | H04J/3/00 |

OTHER PUBLICATIONS

"Am186™ Ed/EDLV Microcontrollers User's Manual," Advanced Micro Devices, Inc. 1997, Chapters 1 and 10.

"Am186™ ES/ESLV and AM188™ ES/ESLV High Performance, 80C186–/80C188–Compatible and 80 L 186–/80L 188–Compatible, 16–Bit Embedded Microcontrollers," Advanced Micro Devices, Inc., Feb. 1997, pp. 1–2, 5–6, 9–10 and 51–52.

(List continued on next page.)

Primary Examiner—Thomas Lee
Assistant Examiner—Katharina Schuster
(74) Attorney, Agent, or Firm—Akin, Gump, Strauss, Hauer & Feld LLP (57) ABSTRACT

An asynchronous serial port provides automatic parity generation and detection in frames supporting address bits. In data frames comprising a variable number of data bits, the parity bit is located immediately following the last data bit and before the address bit. Parity generation is performed automatically based only on the preceding data bits. Parity detection allows interrupts to be generated directly from the parity bit received. Further, parity generation and detection is not dependent on the number of bits in the data frame.

31 Claims, 9 Drawing Sheets

U.S. PATENT DOCUMENTS

| | | | |
|---|---|---|---|
| 5,530,704 | | 6/1996 | Gibbons et al. ............... 370/510 |
| 5,537,425 | * | 7/1996 | Tsou ............... 714/805 |
| 5,555,438 | * | 9/1996 | Blech et al. ............... 710/30 |
| 5,682,552 | * | 10/1997 | Kuboki et al. ............... 710/52 |
| 5,713,028 | * | 1/1998 | Takahashi et al. ............... 713/322 |
| 5,717,870 | * | 2/1998 | Dobson ............... 709/250 |
| 5,729,004 | * | 3/1998 | Kim et al. ............... 235/492 |
| 5,748,887 | * | 5/1998 | Kim et al. ............... 714/52 |
| 5,805,909 | * | 9/1998 | Diewald ............... 713/322 |
| 5,808,909 | | 9/1998 | Rees ............... 702/114 |
| 5,878,061 | * | 3/1999 | Hauck et al. ............... 714/800 |
| 5,896,549 | | 4/1999 | Hansen et al. ............... 110/22 |
| 5,938,773 | * | 8/1999 | Hauck et al. ............... 714/6 |
| 5,958,024 | * | 9/1999 | Typaldos et al. ............... 710/26 |
| 5,978,865 | * | 11/1999 | Hansen et al. ............... 710/22 |
| 5,978,954 | * | 11/1999 | Ou et al. ............... 714/769 |
| 5,983,291 | * | 11/1999 | Leger et al. ............... 710/52 |
| 6,015,081 | | 1/2000 | Okabayashi et al. ............... 228/180.22 |
| 6,028,675 | | 2/2000 | Fields et al. ............... 358/1.14 |
| 6,105,081 | * | 8/2000 | Typaldos ............... 710/26 |

OTHER PUBLICATIONS

"Asynchronous serial multidrop systems using 9–data bit frames," Electronics Products Design, Jan. 1998, pp. C15–C18.

"8–bit Single–Chip Microcontroller", NEC MOS Integrated Circuit Jul. 1997, Doc No. U12436EJ1V0DS00 (1st ed.), pp. 7–48.*

"Use of Dynamic Memory Access Asynchronous Communications in the Asynchronous Communications Device Interface", IBM Tech. Discl. Bull., Sep. 1992, V. 35, No. 4A, pp. 132–134.*

"Serial Data Link Design for an Automotive Display System", IBM Tech. Discl. Bull., Aug. 1988, V. 31, No. 3, pp. 471–474.*

"Native I/O Ports for Personal Computer System Board", IBM Tech. Discl. Bull., Jun. 1987, V. 30, No. 1, pp. 18–25.*

Frank Durda IV, "The UART: What It Is and How It Works", FreeBSD Handbook, Jan. 1996, Appendix F. PC Hardware Compatibility, F.4.3.1.*

Vahid et al. "The Case for a Configure–and–Execute Paradigm", Proceedings of the Seventh International Workshop on Hardware/Software Codesign, 1999, pp. 59–63.*

Yang et al. "Optimal Frame Rate Detection for CDMA Mobile Stations with Variable–Rate Data Transmission", Communications, 1999. APCC/OECC '99, 5th Asia–Pacific Conference on, pp. 713–716.*

Chou et al. "Synthesis of the Hardware/Software Interface in Microcontroller–Based Systems", Proceedings of the 1992 IEEE/ACM International Conf. on Computer–Aided Design, 1992, pp. 488–495.*

* cited by examiner

| CONFIG | Control Signals | | | | Multiplexer Output (decode from rxs_data[10:0]) | | | | |
|---|---|---|---|---|---|---|---|---|---|
| | EARLY | D7 | PEN | ABEN | rxst_stat | | | rxst_data[7:0] | |
| | | | | | frame | parity bit | address bit | D[7] | D[6:0] |
| 1 | 0 | 0 | 0 | 0 | [10] | 0 | 0 | [9] | [8:2] |
| 2 | 0 | 0 | 0 | 1 | [10] | 0 | [9] | [8] | [7:1] |
| 3 | 0 | 0 | 1 | 0 | [10] | [9] | 0 | [8] | [7:1] |
| 4 | 0 | 0 | 1 | 1 | [10] | [9] | [8] | [7] | [6:0] |
| 5 | 0 | 1 | 0 | 0 | [10] | 0 | 0 | 0 | [9:3] |
| 6 | 0 | 1 | 0 | 1 | [10] | 0 | [9] | 0 | [8:2] |
| 7 | 0 | 1 | 1 | 0 | [10] | [9] | 0 | 0 | [8:2] |
| 8 | 0 | 1 | 1 | 1 | [10] | [9] | [8] | 0 | [7:1] |
| 9 | 1 | 0 | 0 | 0 | [10] | 0 | 0 | [9] | [8:2] |
| 10 | 1 | 0 | 0 | 1 | [10] | 0 | [9] | [8] | [7:1] |
| 11 | 1 | 0 | 1 | 0 | [10] | [9] | 0 | [8] | [7:1] |
| 12 | 1 | 0 | 1 | 1 | [10] | [8] | [9] | [7] | [6:0] |
| 13 | 1 | 1 | 0 | 0 | [10] | 0 | 0 | 0 | [9:3] |
| 14 | 1 | 1 | 0 | 1 | [10] | 0 | [9] | 0 | [8:2] |
| 15 | 1 | 1 | 1 | 0 | [10] | [9] | 0 | 0 | [8:2] |
| 16 | 1 | 1 | 1 | 1 | [10] | [8] | [9] | 0 | [7:1] |

*FIG. 8B*

Configuration 1 rxs_data[10:0]

| 0 | 1 | 2 | 3 | 4 | 5 | 6 | 7 | 8 | 9 | 10 |
|---|---|---|---|---|---|---|---|---|---|----|
|   |   | 1 | 1 | 0 | 1 | 0 | 0 | 1 | 0 | 0  | rxs_data[7:0]

| 0 | 1 | 2 | 3 | 4 | 5 | 6 | 7 |
|---|---|---|---|---|---|---|---|
| 1 | 1 | 0 | 1 | 0 | 0 | 1 | 0 | rxs_stat

| Frame | Parity | addr. |
|-------|--------|-------|
| 0     | 0      | 0     |

Configuration 8 rxs_data[10:0]

| 0 | 1 | 2 | 3 | 4 | 5 | 6 | 7 | 8 | 9 | 10 |
|---|---|---|---|---|---|---|---|---|---|----|
|   | 0 | 1 | 1 | 1 | 0 | 1 | 1 | 0 | 1 | 0  | rxs_data[7:0]

| 0 | 1 | 2 | 3 | 4 | 5 | 6 | 7 |
|---|---|---|---|---|---|---|---|
| 0 | 1 | 1 | 1 | 0 | 1 | 1 | 0 | rxs_stat

| Frame | Parity | addr. |
|-------|--------|-------|
| 0     | 1      | 0     |

Configuration 16 rxs_data[10:0]

| 0 | 1 | 2 | 3 | 4 | 5 | 6 | 7 | 8 | 9 | 10 |
|---|---|---|---|---|---|---|---|---|---|----|
|   | 0 | 1 | 1 | 1 | 0 | 1 | 1 | 0 | 1 | 0  | rxs_data[7:0]

| 0 | 1 | 2 | 3 | 4 | 5 | 6 | 7 |
|---|---|---|---|---|---|---|---|
| 0 | 1 | 1 | 1 | 0 | 1 | 1 | 0 | rxs_stat

| Frame | Parity | addr. |
|-------|--------|-------|
| 0     | 0      | 1     |

UART AUTOMATIC PARITY SUPPORT FOR FRAMES WITH ADDRESS BITS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to microcontrollers, and more specifically, to a microcontroller having automatic parity checking capabilities in an asynchronous serial port.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may support a wide range of communication applications.

Microcontrollers have been used for many years in many applications. A number of these applications involve communications over electronic networks, such as telephone lines, computer networks, and local and wide area networks, in both digital and analog formats. In communications applications, a microcontroller generally has a number of integrated communications peripherals in addition to the execution unit. These can be low and high speed serial ports, as well as more sophisticated communications peripherals, such as a universal serial bus (USB) interface, and high level data link control (HDLC) channels.

An asynchronous serial communications port is one such common additional feature in a microcontroller. An asynchronous serial link allows the microcontroller to communicate with other devices or over data lines by sequentially sending and receiving bits of data. The "asynchronous" nature indicates these ports do not provide a separate clock signal to clock the data. Instead, the rate at which data is sent and received must be predetermined or prenegotiated, and independently controlled on both the sending and receiving ends. This data rate is known as the baud rate, which is the inverse of one bit period. The baud rate is generally one of a number of predefined rates, which are standard within the industry. Such rates include 1200, 2400, 4800, 9600, 19.2K, 28.8K, 33.3K, and 54K baud and high data transfer rates.

Due to the prevalence of serial data communication, many microcontrollers include one or more asynchronous serial ports (ASPs) which can transmit and receive data one bit at a time. Such microcontrollers typically employ interrupt signals to notify the microprocessor core that an ASP requires service. An ASP typically issues an interrupt request signal when a data unit has been received by the ASP and needs to be transferred from the ASP to an external memory unit, when the ASP is finished transmitting a data unit and the next data unit to be transmitted must be transferred from the external memory unit to the ASP, or when an error occurs.

Error checking is a primary concern with serial data communication. If a signal has errors when received, the ASP needs to be able to detect such errors and request retransmission. Parity checking has long been utilized as a basic form of such error detection. Parity may be used in a number of ways, although primarily either an odd or an even configuration is employed. The transmitter and the receiver agree that parity checking is enabled and on the specific type of parity to be used. With parity enabled, a parity bit is included in every transmitted data frame. The value of the parity bit is set so that all data bytes, including the data bits and the parity bit, have either an odd number or an even number of set bits, depending on the parity configuration used.

An ASP can be configured for a variety of data formats, although historically seven or eight data bits are typical values. A number of nine-bit serial protocols, however, have been developed using microcontrollers. These protocols are described in the Am 186ES Users Manual and Am 186ED Users Manual, both by Advanced Micro Devices, Inc. of Sunnyvale, Calif. As described in that documentation, and as discussed below, a separate control bit is set or reset to act as the ninth data bit during transmission and reception of data. This ninth "data" bit is employed as an address bit, particularly useful in multi-drop protocols.

In protocols using an address bit, the address bit is typically transmitted as the last data bit. However, this configuration has complicated automatic parity generation and detection. Previously, therefore, parity support could only be provided through dedicated software routines which were able to skip or ignore the presence of the address bit. The utility of such software has been dependent on the number of bits in the frame. Furthermore, in systems supporting parity through software, interrupts could not be generated off the parity bit.

SUMMARY OF THE INVENTION

In a system according to the invention, a microcontroller provides an asynchronous serial port having automatic parity support for frames with address bits. Within each frame, the address bit follows a parity bit following a series of data bits and precedes a high stop bit. To support automatic parity generation and detection in transmission and reception of frames having an address bit, the parity bit is placed immediately after the last data bit. In this way, the generation and detection of the parity bit does not require independent software control. Likewise, interrupts can be generated automatically, directly off of the received parity bit. In addition, parity generation and detection is not dependent upon the length of frames in the asynchronous serial port. By placing the parity bit immediately after the last data bit and before the address bit in a frame, parity bit generation, and detection is performed automatically and independently of the number of data bits. This configuration provides full hardware support for interrupts generated from parity bits.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

The following applications are hereby incorporated by reference as set forth in their entirety:

U.S. patent application Ser. No. 09/088,610, entitled UART CHARACTER MATCHING USED FOR ADDRESS MATCHING ON A REGISTER-BY-REGISTER BASIS filed Jun. 1, 1998, by Melanie D. Typaldos; and U.S. patent application Ser. No. 08/775,262 entitled A MICROCONTROLLER HAVING HARDWARE FEATURES SUPPORTING 9-BIT SERIAL PROTOCOLS DURING DMA DATA TRANSFERS TO AND FROM ONE OR MORE ASYNCHRONOUS SERIAL PORTS, filed Feb. 4, 1997, by John P. Hansen, Ronald W. Stents, and Melanie D. Typaldos; and U.S. patent application Ser. No. 09/184,127 entitled UART SUPPORT FOR ADDRESS BIT ON SEVEN BIT FRAMES, filed concurrently herewith, by Melanie D. Typaldos.

Figure 1A:
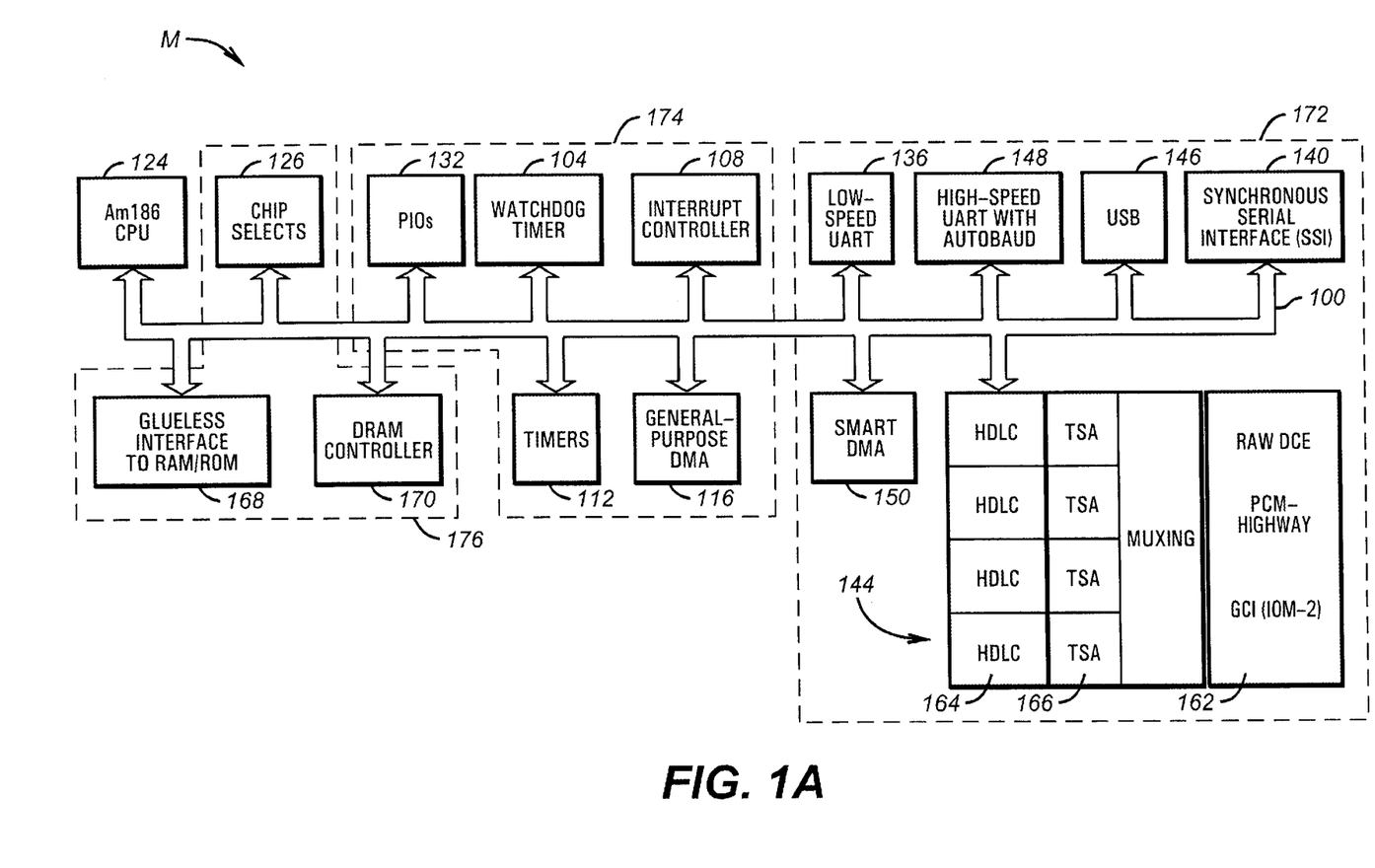
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176, and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three-channel timer control unit 112. The timer control unit 112 includes three 16-bit programmable timers. Another system peripheral is a general-purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 1B:
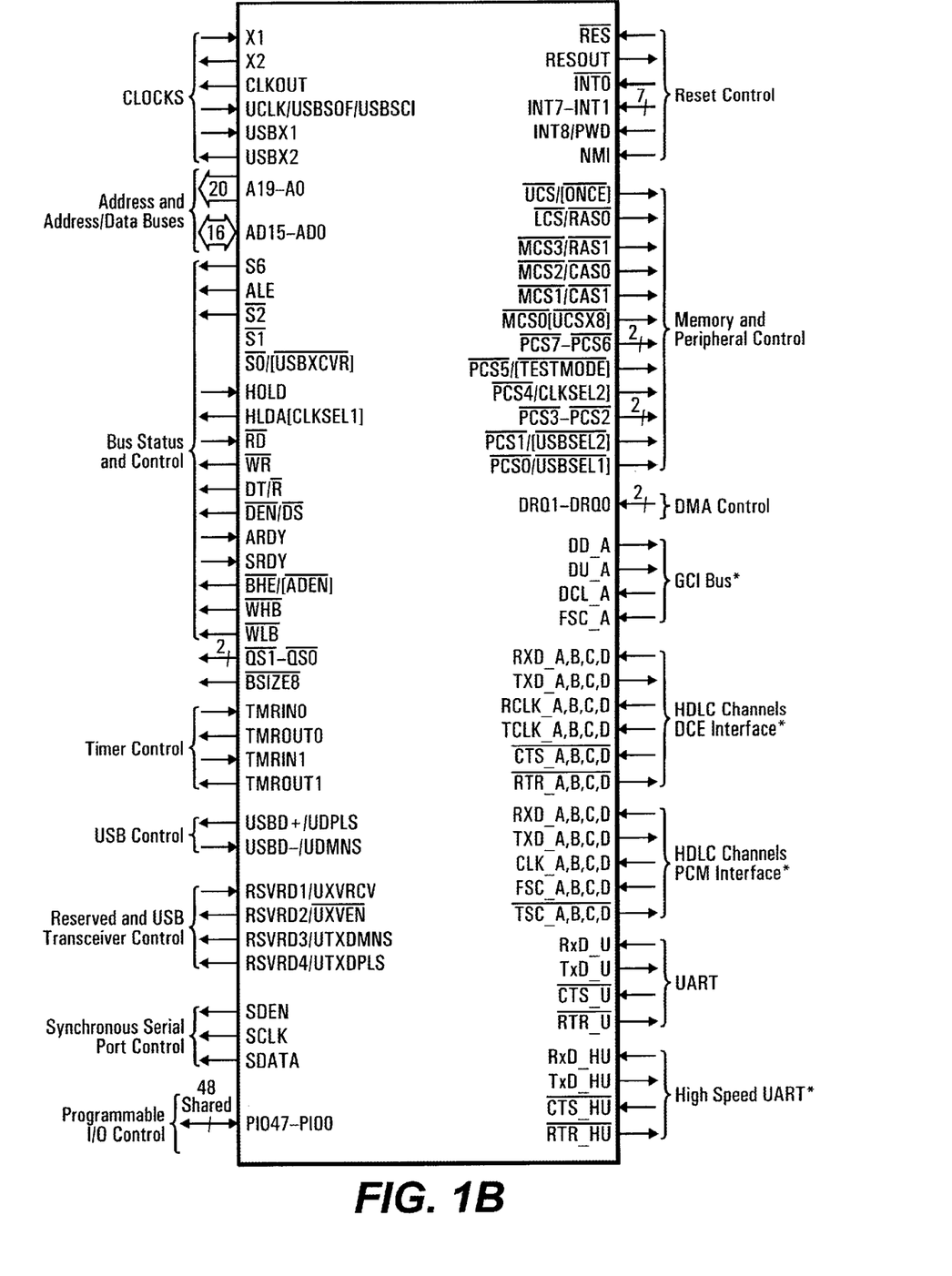
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general-purpose peripherals from FIG. 1A could be eliminated, or added to, without detracting from the spirit of the invention.

The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general-purpose controller functions. As here used, the term "microcontroller" covers all of the products, and generally means an execution unit with added functionality all implemented on a single monolithic integrated circuit.

Figure 2A:
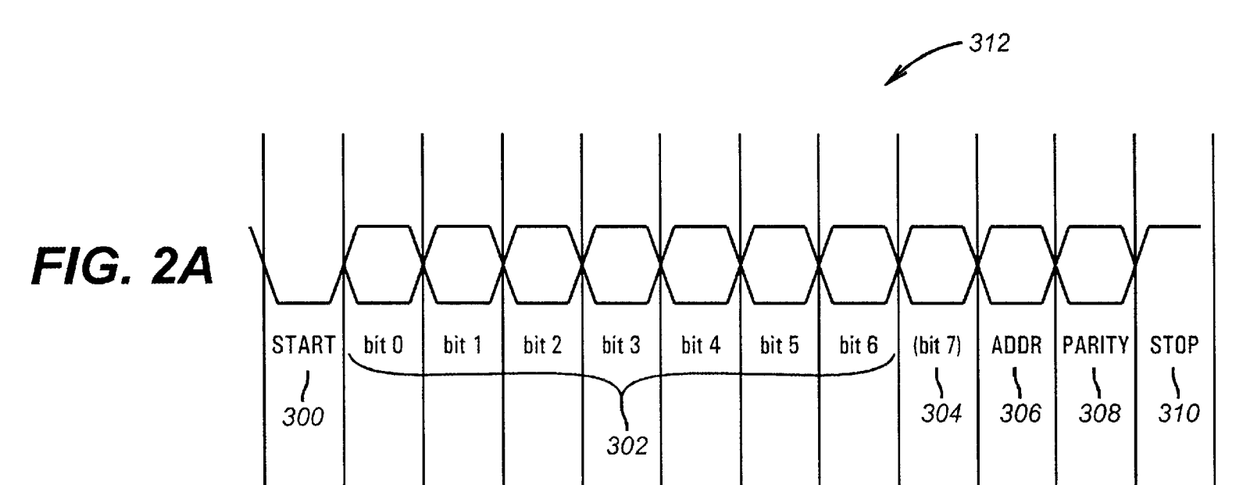
FIGS. 2A and 2B are timing diagrams illustrating the use of parity bits within an asynchronous serial frame having address bits.
Figure 2B:
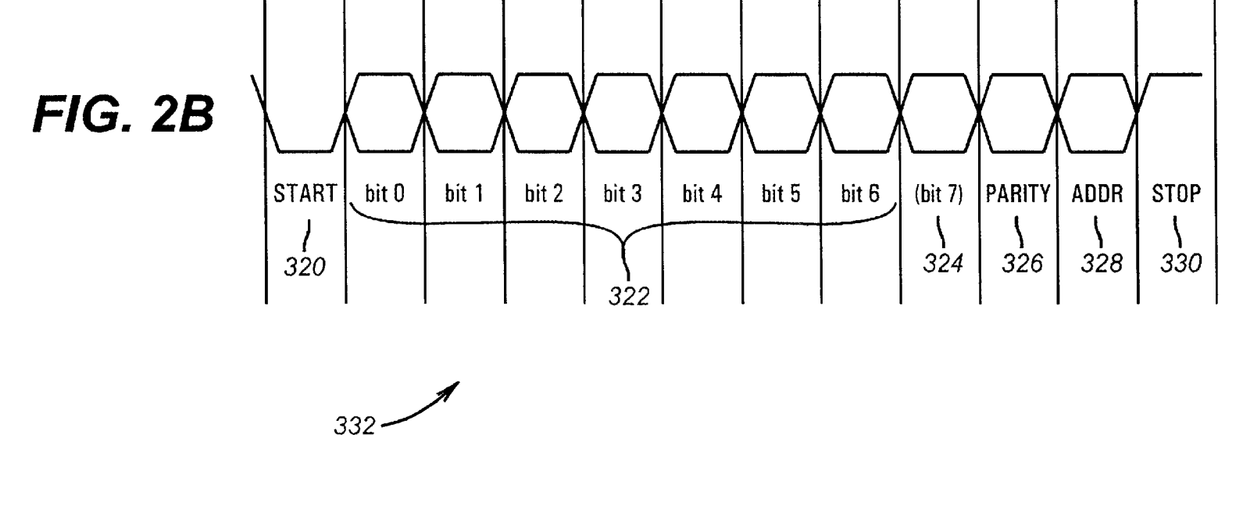

Referring to FIGS. 2A and 2B, shown are asynchronous serial transmission frames 312 and 332 illustrating the placement of a parity bit and an address bit according to the present invention. After a start bit 300, an asynchronous serial port (ASP), such as the UART 136 or HSUART 148, transmits seven data bits (bit 0 through bit 6) 302 and an optional eighth bit (bit 7) 304. These are standard data bits sent in an asynchronous protocol, low order bit first. After the last data bit 304, the address bit protocol supported by the ASP provides an address bit 306. After the address bit 306, a parity bit 308 is then followed by a stop bit 310. Although frames, or characters, in most present day applications typically have either a total of eight or seven data bits, protocols supported by UARTs in accordance with the present invention may provide any number of data bits.

Turning to FIG. 2B, illustrated is a transmission frame 332 where a parity bit 326 is placed before an address bit 328. After a start bit 320, the ASP transmits data bits zero through six 322 and a last bit 324. With an early parity feature selected, a parity bit 326 is then followed by an address bit 328 and then a stop bit 330. Therefore by enabling early parity, the parity bit 326 is placed immediately following the last data bit 324. Further, early parity generation is independent of the number of data bits in the frame. In other words, regardless of whether seven or eight data bits are transmitted, the parity bit 326, with the early parity enabled, follows the last data bit transmitted.

The address bit 306 and 328 may be used in applications such as multi-drop applications that require one master device to control multiple slave devices. Although termed an address bit, bit 306 and 328 may serve as an extended bit that effectively causes interrupts within slave devices for flow and other control.

Figure 3:
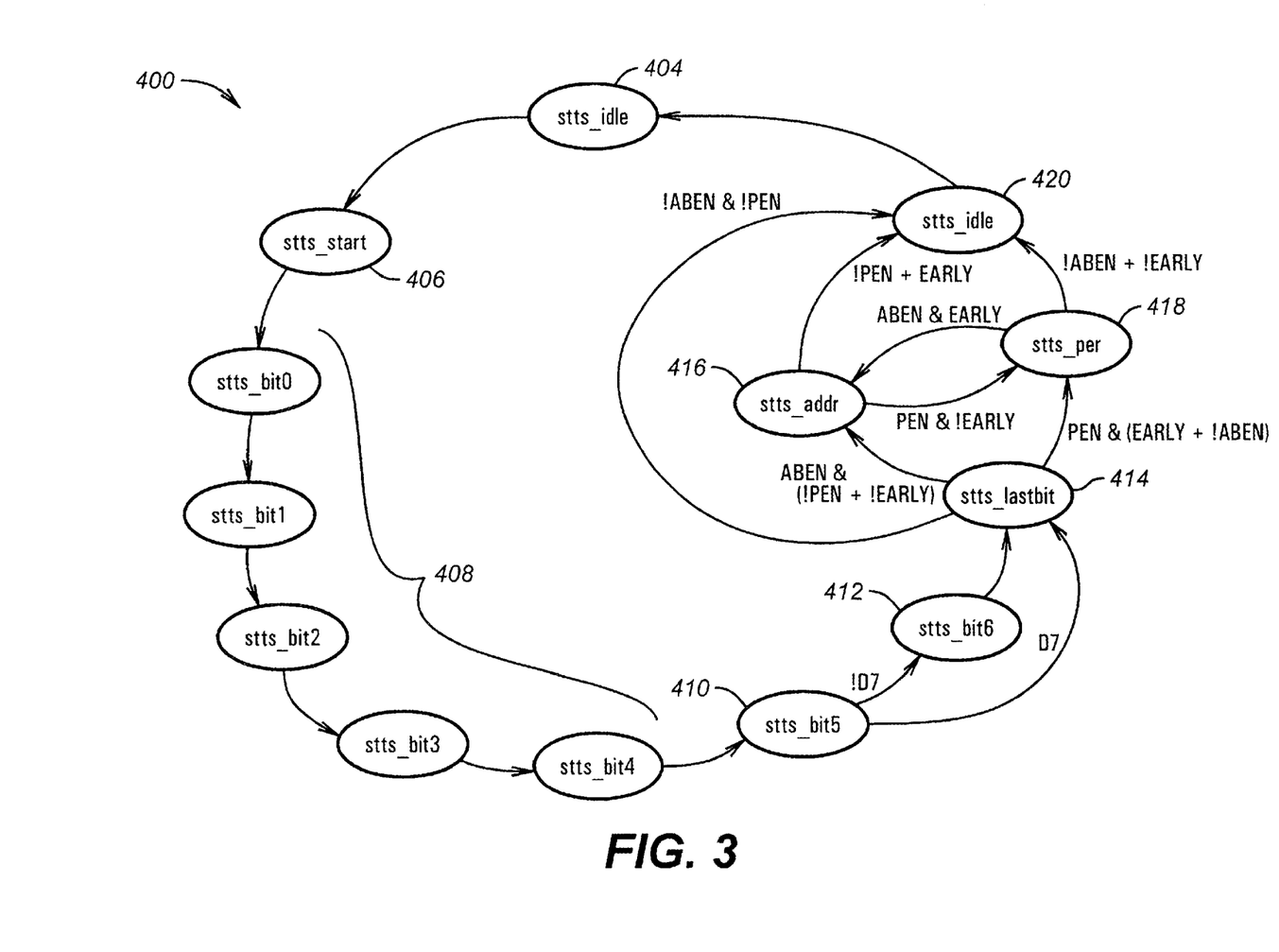
FIG. 3 is a transmit shift state machine for transmitting asynchronous serial frames.

The operation of a transmit shift state machine TX_SHIFT_SM 400 is illustrated in FIG. 3 when the ASP is operated in a transmit mode. The TX_SHIFT_SM state machine 400 is the transmit shift state machine which sets the sequence of bits for transmission frames 312 and 322. The state machine 400 is typically implemented in the circuitry of an ASP, such as the UART 136 or the HSUART 148. As explained below, the TX_SHIFT_SM state machine 400 allows frame transmission to skip a data bit, thereby reducing the total number of data bits transferred. For purposes of this disclosure the following meanings apply: "state" referrings to the current state of the TX_SHIFT_SM state machine 400; an "!" before a signal indicating logical negation, such that the expression is active when the signal is low; an "&" representing an AND logical expression; and an "+" represents an OR logical expression.

Figure 5:
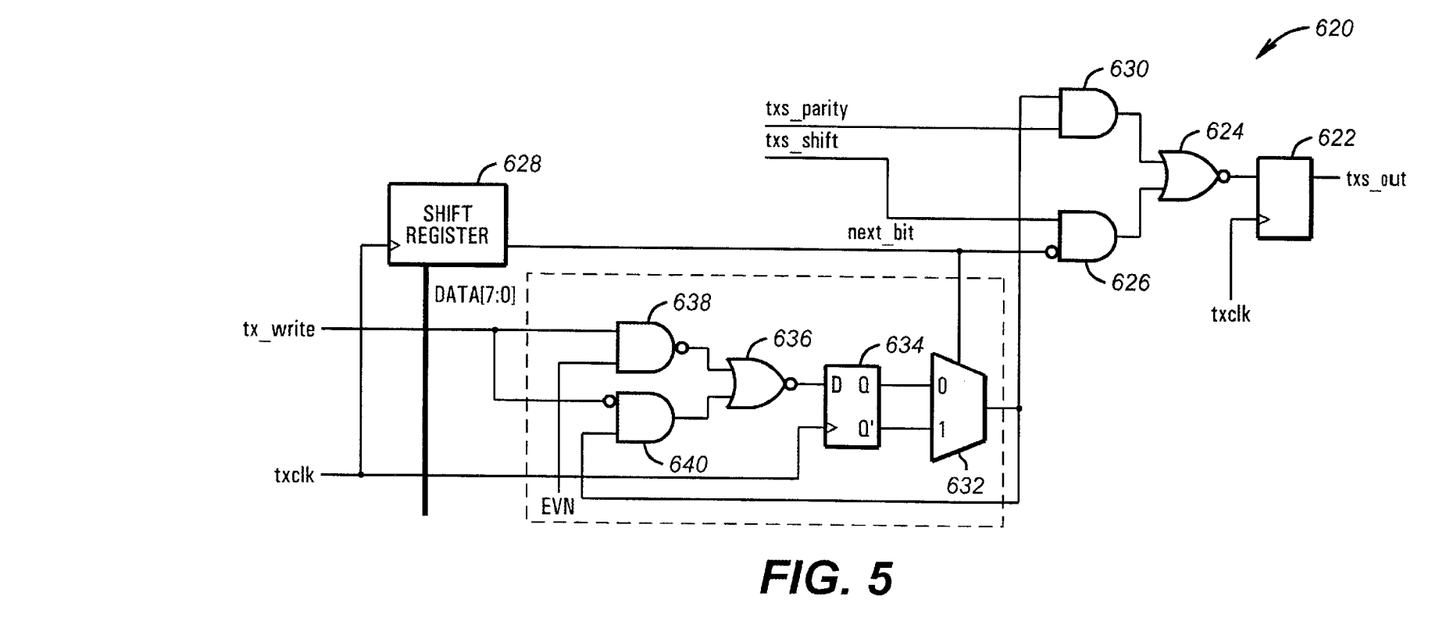
FIG. 5 a diagram illustrating parity generation logic.

The TX_SHIFT_SM state machine 400 is clocked by a transmit clock txclk (FIG. 5). Control begins at a stts_idle state 404. This state indicates that there is no data currently in a shift register 625 (FIG. 5) On the first transmission of the transmit clock txclk after data is written to a the shift register 628 (FIG. 5), control proceeds to stts_start state 406. The stts_start state 406 indicates transmission of a start bit. On subsequent transmit clock transitions, control proceeds from stts_bit0 state through stts_bit4 state 408. This traversal of states is designated by reference numeral 408. At each of these states, the corresponding bit is transmitted. For example, at stts_bit0 state, the zero bit is transmitted. In a like manner, a corresponding bit is transmitted in the stts_bit1, stts_bit2, stts_bit3, and stts_bit4 states. After the stts_bit4 state, control proceeds to stts_bit5 state 410. In the sts_bit5 state 410, the fifth bit is transmitted. After the fifth bit is transmitted, control proceeds to a stts_bit6 state 412 if a D7 signal 504 (FIG. 5) is deasserted. After the sixth bit has been transmitted, on the next transmit clock transition, control proceeds to a stts_lastbit state 414. Alternatively, after the stts_bit5 state 410, control proceeds directly to the stts_lastbit state 414 if D7 signal 504 (FIG. 5) is asserted. Thus, upon assertion of the D7 signal 504 (FIG. 5), the TX_SHIFT_SM state machine 400 is able to transmit one fewer bit.

After transmission of the last bit, either the seventh or eighth bit 414, control proceeds to an stts_per state 418 if both parity enable signal PEN 508 (FIG. 5) and an early parity signal EARLY 514 (FIG. 5) are asserted. The PEN signal 508 represents the state of the parity bit 308 or 326. The parity bit 308 or 326 is enabled if the PEN signal 508 is asserted and the parity bit 308 or 326 is disabled if the PEN signal 508 is deasserted. The EARLY signal 514, when the PEN signal 508 is asserted, represents the location of the parity bit 308 or 326 within the transmission frame. The parity bit 326 is placed immediately following the last data bit, shown in FIG. 2B, when the EARLY signal 514 is asserted. The parity bit 308 is placed after the address bit 306, shown in FIG. 2A, when the EARLY signal 514 is deasserted. However, when the PEN signal 508 is deasserted, the value of the EARLY signal 514 will have no effect on the placement of the parity bit 308 or 326.

After transmission of the parity bit 326 at stts_per state 418, control proceeds to stts_addr state 416 when an address bit enable signal ABEN 506 is asserted along with the EARLY signal 514. This transition logic simplifies when parity is transmitted immediately after a last data bit as the EARLY signal 514 will have been previously asserted. In this case, control proceeds to stts_addr state 416 when the ABEN signal 506 is asserted. The ABEN signal 506 represents the state of the address bit 306 or 328. The address bit 328 is enabled if the ABEN signal 506 is asserted and the address bit 306 or 328 is disabled if the ABEN signal 506 is deasserted. Control then proceeds to a stts_stop state 420 when either the PEN signal 508 is deasserted or when the EARLY signal 514 is asserted. Along the path just described, the EARLY signal 514 is asserted to cause the parity bit 326 to be placed immediately after the last data bit 328. As such, control proceeds to stts_stop state 420 upon the next transmission of the transmit clock. Therefore, following the state machine path as just described, the transmitted frame will be in the form of the transmission frame 332 shown in FIG. 2B with the parity bit 326 located before the address bit 328.

Alternatively, an address bit 306 can be transmitted in a location before the parity bit 308 as shown in FIG. 2A. With the address bit 306 selected as the next bit, control proceeds from stts_last bit state 414 to stts_addr state 416 when the ABEN signal 506 is asserted and either the PEN signal 508 is deasserted or the EARLY signal 514 is deasserted. This transition logic allows the address bit to proceed a parity bit in transmission frames having both address bits and parity bits enabled. In such a transmission frame, the PEN signal 508 is asserted but the EARLY signal 514 is deasserted. Therefore, at stts_addr state 416 control proceed to stts_per state 418 on the next transition of the transmit clock. Control then proceeds to stts_stop state 420 when either the ABEN signal 508 is deasserted or the EARLY signal 514 is deasserted. Here again, in frames locating the address bit 306 before the parity bit 308, the EARLY signal 514 is deasserted and control proceeds to stts_stop state 420 on the next transmit clock transition. Therefore, along this path through the state machine 400 a transmission frame 312 has an address bit 306 placed before the parity bit 308 as shown in FIG. 2A.

In a system according to the present invention, the transmission frame may altogether exclude an address bit or a parity bit or both. Where an address bit is generated but not a parity bit, control will follow from stts_last bit state 414 to stts_addr state 416 and then to stts_stop state 420, as the PEN signal 508 is deasserted. Likewise, in transmission frames having a parity bit but not an address bit, control will follow the path from stts_last bit state 414 to stts_per state 418 and then to stts_stop state 420, as the ABEN signal 506 is deasserted. In the case where both ABEN signal 506 and the PEN signal 508 are deasserted, where neither an address bit nor a parity bit are included in the transmission frame, control proceeds directly from stts_last bit state 414 to stts_stop state 420.

Therefore, when early parity is enabled. the parity bit 326 (FIG. 2B) is transmitted immediately following transmission of the last data bit. This setup ensures the parity bit 326 always proceeds the address bit 328. In this way, parity is automatically detected based on the location of the preceding data bits 322 and 324. Since the address bit 328 follows the parity bit 326, parity generation need not involve locating the address bit 328. The placement of the parity bit 326 is not dependent on a specific frame protocol. Instead, the parity bit 326 is placed at a location immediately following the last data bit (e.g. seven bit or eight bit) regardless of the frame length.

Figure 4:
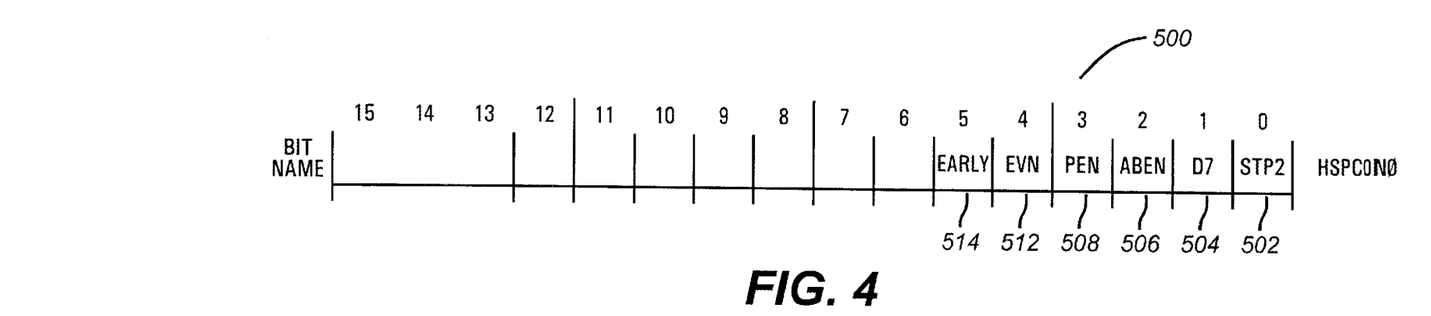
FIG. 4 is a block diagram illustrating the register contents in an asynchronous serial port according to the present invention.

Turning to FIG. 4, illustrated is a HPSPCON0 register 500 that implements parity generation, according to the present invention, when implemented in the HSUART 148 (FIG. 1). In the disclosed embodiment, the register 500 is a 16-bit register. The HPSPCON0 500 register, in part, provides configuration settings to determine whether parity will be used (indicated by the parity enable bit PEN 508) and if so whether parity will precede an address bit (indicated by the early parity bit EARLY 514), whether an address bit 308 will be employed (indicated by the address bit enable bit ABEN 506), whether seven or eight bit data will be used (indicated by an enable bit D7 504), and whether a second stop bit will be used (indicated by a second stop bit enable bit STP2 502).

A second stop bit is enabled if the STP2 signal 502 is asserted, and the second stop bit is disabled if the STP2 signal 502 is deasserted. In addition, parity may be configured as either odd or even parity by an even parity bit EVN 512. Even parity is enabled if the EVN signal 512 is asserted, and odd parity is enabled if the EVN signal 512 is deasserted.

The bits 502–508 of the HPSCON0 register 500 affect the length of a transmit frame. Historically, hardware implementations of address bits required the address bit to be the "ninth" data bit regardless of whether the eighth data bit was needed and regardless of whether parity was involved. As such parity generation and detection required dedicated software to first determine whether an address bit was present and, if so, to instruct the parity sequence to ignore or skip the address bit. The utility of such software has been dependent on the number of data bits employed in the frame protocol. For example, software parity support has been developed for asynchronous serial communication frames having address bits and only seven bits of data. In accordance with the present invention, parity generation and detection may be performed without software and with frames containing any number of data bits (e.g. seven or eight bits).

Referring now to FIG. 5, shown is transmit shift logic 620 for implementing parity generation according to the present invention. The transmit shift logic 620 provides the conversion of parallel data bits DATA[8:0] to a serial data transmission frame 312. The serial output, including the parity bit 306, is presented in the txs_out signal. Each bit of the txs_out signal is clocked out of a latch 622 on transitions of the transmit clock signal txclk. The input to the latch 622 is provided from the inverted output of an OR gate 624. The OR gate 624 passes either the value of the parity bit 306, provided from the output of an AND gate 630, or the values of the data bits, provided from the output of an AND gate 626. The AND gate 626 outputs data bits shifted from a shift register 628 into the next_bit signal when the tsx_shift signal is asserted. In the disclosed embodiment, the shift register 628 is a 10-bit shift register. The tsx_shift signal is asserted when the txs_out line should reflect the value shifted out of the shift register 628. The shift register 628 shifts the contents provided by the parallel data signal DATA[7:0] on transitions of the transmit clock txclk.

The current value of parity is provided to the AND gate 630. Upon assertion of txs_parity signal, this current value of parity is passed. The txs_parity signal is asserted when the txs_out line should reflect the value of parity generation logic 642. Referring again to the transmit state machine 400 shown in FIG. 3, the parity bit 306 will immediately follow the last data bit. The value of parity is output from a 2-to-1 multiplexer 632 having the next_bit signal as its select signal. The inputs to the multiplexer 632 are provided by the non-inverted output and the inverted output of a D type flip-flop 634, clocked by the transmit clock txclk. The initial parity value is loaded in the flip-flop 634 through an AND gate 638 when a tx_write signal is asserted, indicating that there has been a write of new data to the shift register 628. Since parity may be configured to either even or odd parity, this initial parity value depends on the even parity status bit EVN 512. Once bits begin shifting out of the shift register 628, the next bit signal toggles the parity value loaded in the flip-flop 634. The current value of parity is then fed back to the flip-flop 634 through an AND gate 640. Subsequent shifts of the shift register 628 cause the value stored in the flip-flop 634 to toggle depending on the value of the shifted bit in the next_bit signal. The end value of the parity bit for a particular transmission frame is presented on the txs_out signal through the AND gate 630 when the txs_parity signal is asserted following the shift of the last data bit.

Figure 6:
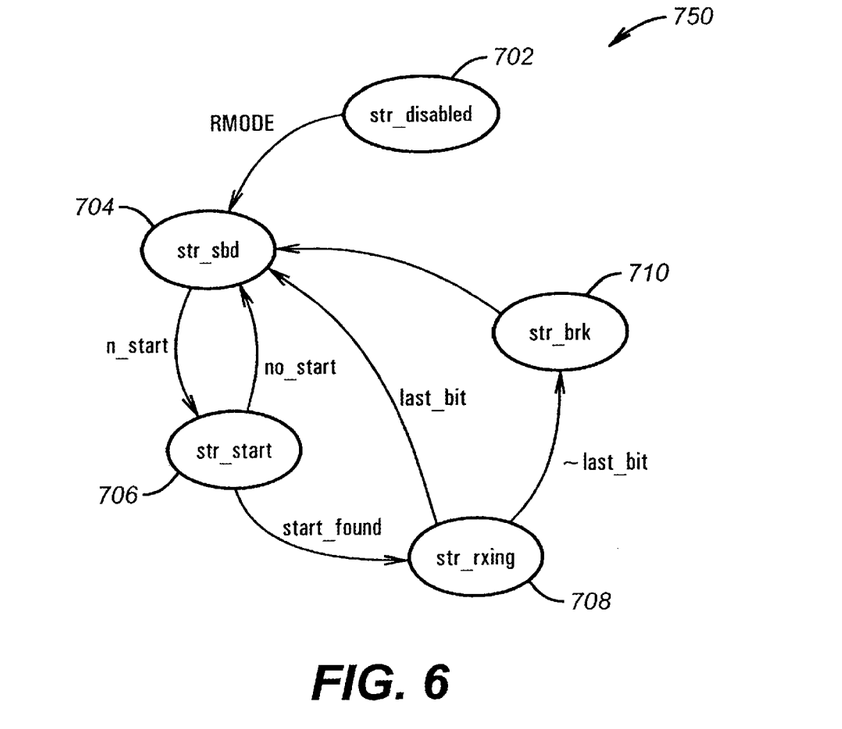
FIG. 6 is a receive state machine for receiving asynchronous serial frames.
Figure 7:
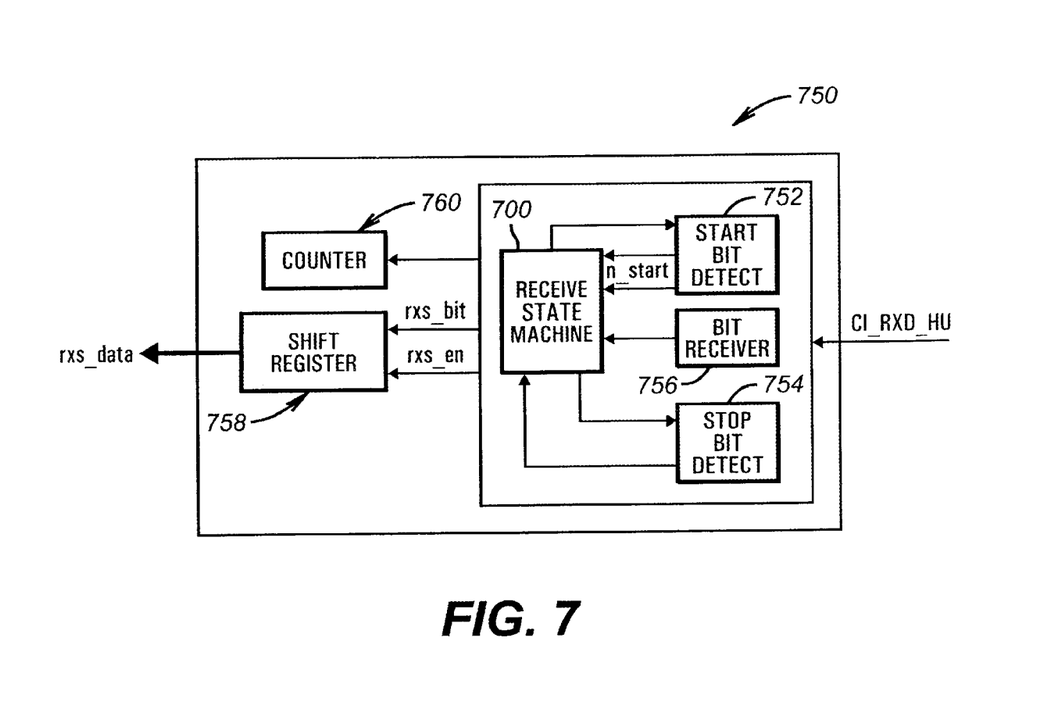
FIG. 7 is a diagram illustrating logic for receive mode operation.

Turning now to FIG. 6, shown is the receiver state machine RX_SM state machine 700. FIG. 7, which shows receiver logic 750, is described in conjunction with FIG. 6. These figures illustrate operation of the ASP when functioning in a receiver mode. Control passes from a str_disabled state 702 when a receive mode of the ASP 136 or 148 is entered. The state machine 700 begins at state str_sbd 704 by detecting a start bit on a receive signal CI_RXD_HU. Once a start bit detection logic 752 finds a start bit, the n_start signal is asserted and control proceeds to a str_start state 706. In the str_start state 706, start bit detection logic 752 checks the receiver line again near the mid-point of the bit time to determine whether a valid start bit has occurred. If no start bit is detected, control returns to state str_sbd 704 where the process repeats itself. Alternatively, where a start bit is found, control proceeds to a str_rxing state 708, where the state machine 700 begins receiving data bits. In this state, the state machine 700 uses normal bit receive logic 756 to sample the receive signal. A receive enable signal rxs_en is asserted when a bit has been detected and is ready to shift into a shift register 758. An internal counter 760 keeps track of the number of bits received. Control remains in the str_rxing state 708 until reception is complete. Reception of the frame is complete when the number of received bits matches the number of expected bits as specified by the ASP. This number is determined based on the state of the D7 signal 504, the PEN signal 508, and the other status signals. Therefore, with the D7 bit 504, the ABEN bit 506, and the PEN bit 508, control will remain in the str_rxing state 708 until bits zero through seven, the parity bit, the address bit, and a stop bit have been received. In this case, control returns back to the str_sbd state 704 when a stop bit is the last bit received, detected by a stop bit detect logic 754. Alternatively, where the last bit received is not a stop bit, control proceeds to a str_brk state 710 where a break condition is detected. Control then returns back to the str_brd state 704 along with the appropriate framing error signal.

Figure 8A:
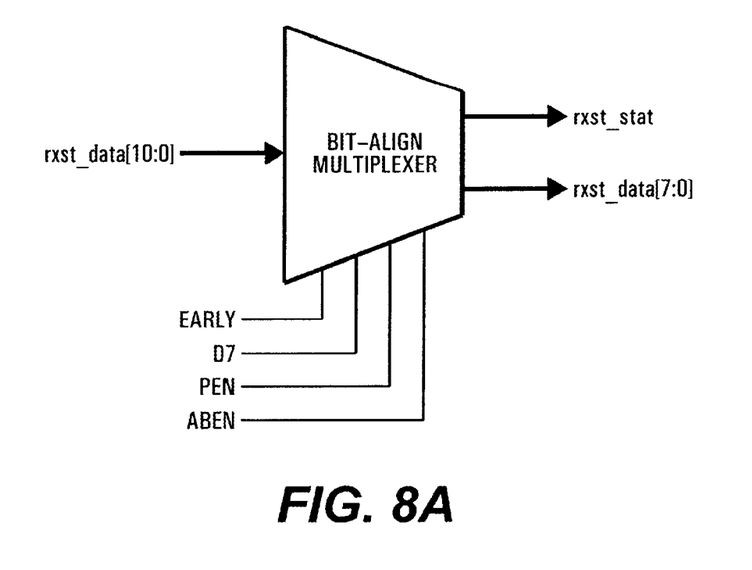
FIGS. 8A and 8B illustrate the decode logic for the receive mode according to the present invention.
Figure 8B:
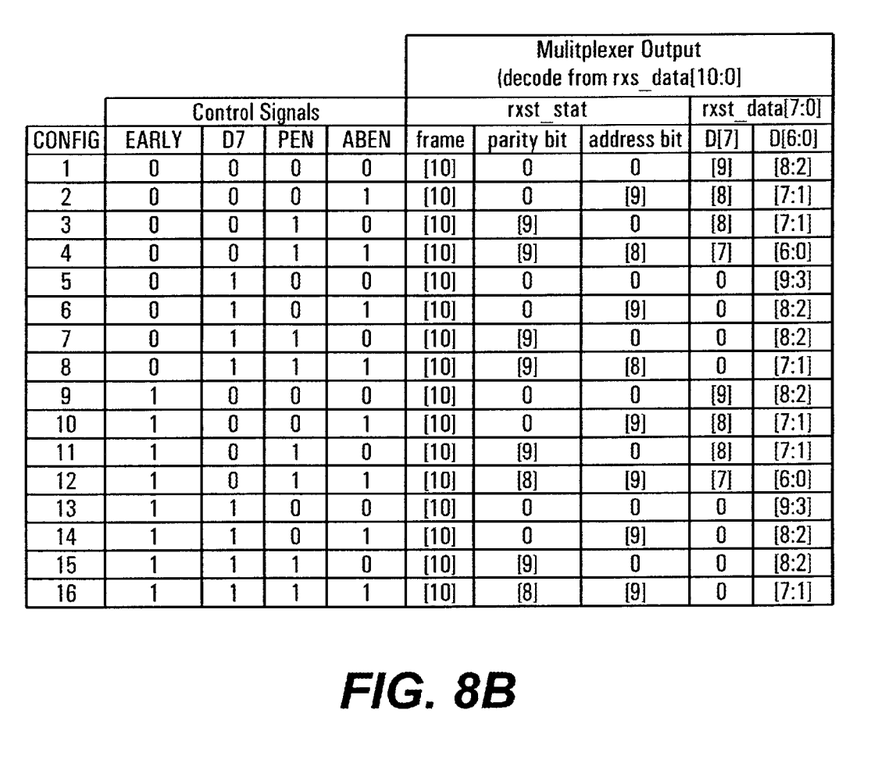

Turning now to FIGS. 8A and 8B, logic is shown for aligning the data received from the receive shift register 758 (FIG. 7) into a preferred format. FIG. 8A illustrates a bit align multiplexer which may be used by system in accordance with the present invention. The multiplexer receives data from the receive shift register 758. In a system according to the present invention, the receive data is eleven bits wide. The rxs_data [10:0] may consist of eight data bits, a parity, an address bit, and a frame bit. However, to allow maximum flexibility, these bits need not all be included in the rxs_data [10:0]. To accommodate this flexibility, a decode mechanism is required to parse the various bits of rxs_data [10:0] and place these bits in an acceptable format. Specifically, a receive mode according to the present invention parses the receive data into a status line rxst_stat and a data line rxst_data [7:0]. This parsing function is controlled by the control signals, early parity EARLY 514, seven data bit enable D7 504, parity enable PEN 508, and address bit enable ABEN 506. Therefore, based on these control signals, the eleven bit data received from the receive shift register 758 is parsed into a convenient format, for example separation of status and data bits.

Figure 9:
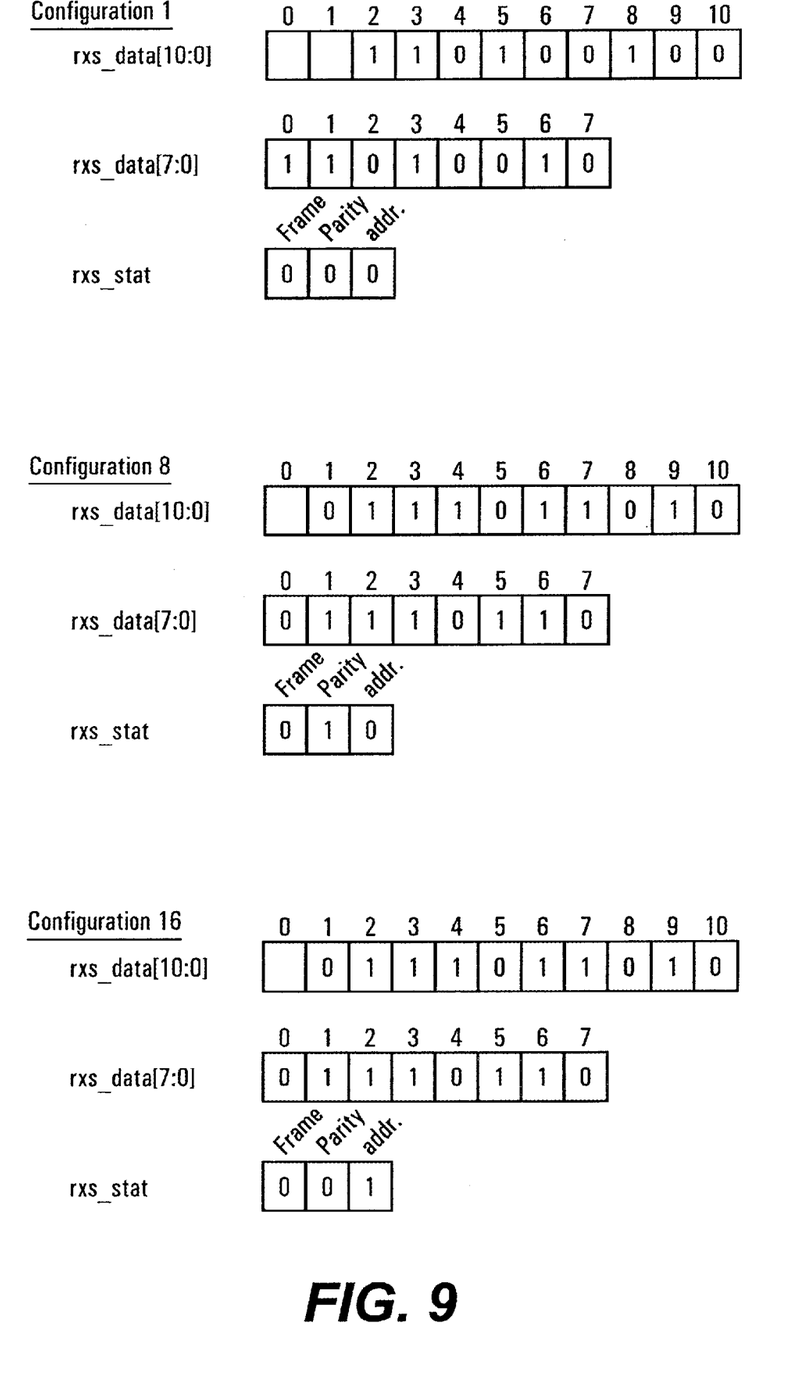
FIG. 9 shows exemplary signals from the decode logic of FIGS. 8A and 8B.

The output for the bit-align multiplexer is shown in detail in FIG. 8B. The multiplexer output represents alignment decoding of the received bits on the input line rxs_data [10:0] to the corresponding bit location on the output signals rxst_stat and rxst_data [7:0]. Because the receive shift register 758 is configured to hold a maximum number of bits, the bit-align multiplexer must fill unused spaces, where they exist, with a zero value For example, looking at the first entry or row, configuration one indicates that neither the parity bit or the address bit are enabled (the values of PEN and ABEN are both zero) and the received frame consists of eight data bits (indicated by the zero value for D7). In this way, two of the bits in the eleven-bit shift register 758 and on the input line rxs_data [10:0] are unused. The bit values for each of the signals is shown in more detail in FIG. 9. Specifically, these unused bits are the parity bit and the address bit, as those bits were disabled. As such, a zero value is forced on the parity bit and address bit on the output line rxst_stat. Further, as eight data bits were received, the value of D[7] on the output rxst_data [7:0] line is the value of the ninth bit on the rxs_data [10:0] input line from the shift register 758. Likewise, the remaining bits [6:0] on the output line rxst_data [7:0] are taken in order from the bit values in bits [8:2] on the input line rxs_data [10:0]. Referring to FIG. 9, to further illustrate, an example input value of rxs_data [10:0] of 00110100100, configuration one selected by the control signals, is parsed into rxst_data [7:0] as 11010010 and rxt_stat as 000 (the bit order of the status line txt_stat being, frame, parity bit, and address bit). Therefore, the output line rxst_data [7:0] takes the bit values from the bit locations [9:2] on the input line rxs_data [10:0]. The output status line rxst_stat takes its frame value from the value of bit [10] on the input line rxs_data [10:0]. Since neither PEN or ABEN signals are asserted, the parity and address bits on the output status line rxst_stat are zero.

Taking another example, with configuration eight selected, the received serial data contains both an address bit and a parity bit (indicated by a value of one for both the PEN and ABEN signals) with the parity bit following the address bit (indicated by a zero value for the EARLY signal). Further, in configuration eight since the D7 signal has a value of one, only seven data bits are received. Referring to FIG. 9, the bit locations for the input and output signals are shown for configuration eight. In this case, the output data line rxst_data [7:0] takes its bit values from the bit values [7:1] of the input line rxs_data [10:0]. The bit values for frame, the parity bit and the address bit on the output status line rxst_stat are taken from the bit locations [10], [9], and [8] respectively, of the input line rxs_data [10:0]. Therefore, on the input line rxs-data [10:0] bit [10] is translated by the bit-align multiplexer to be the frame bit on the output status line rxst_stat. Similarly, bit [9] on the input line rxs_data [10:0] is translated by the bit-align multiplexer to be the parity bit on the output status line rxst_stat. Finally, bit [8] on the input rxs_data [10:0] is translated by the bit-align multiplexer to be the address bit on the output status line rxst_stat. Therefore, because the control signals inform the bit-aligned multiplexer which bits to expect and in which order on the input line rxs_data [10:0], the bit-align multiplexer is able to parse these bits into their respective output signals. For configuration eight, the combination of control signals informs the bit-align multiplexer to expect a total of seven data bits, an address bit, and a parity bit with the address bit received prior to the parity bit.

Alternatively, in configuration 16, the same order of bits is received on the rxs_data [10:0] as in configuration eight, except the parity bit is received before the address bit. In this case, and referring to FIG. 9, the output data line rxst_data [7:0] takes its value from the same bit locations on the input rxs_data [10:0] as in configuration eight. However, since the control signals indicate that parity is received before the address bit, those bit values must be taken from different bit locations on the input line rxs_data [10:0]. Specifically, the parity value is taken from bit [8] and the value of the address bit is taken from bit [9] on the input line rxs_data [10:0]. Therefore, although the value of the input line rxs_data [10:0] is the same for configuration eight and configuration sixteen, the output status lines in those configurations are different. This is so because the definitions represented by the received bits are different in the different configurations.

Figure 10A:
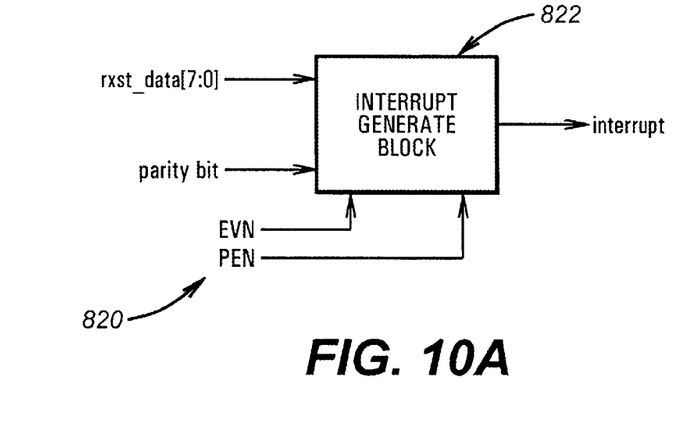
FIG. 10A and 10B are logic diagrams for generating interrupts from a parity bit.
Figure 10B:
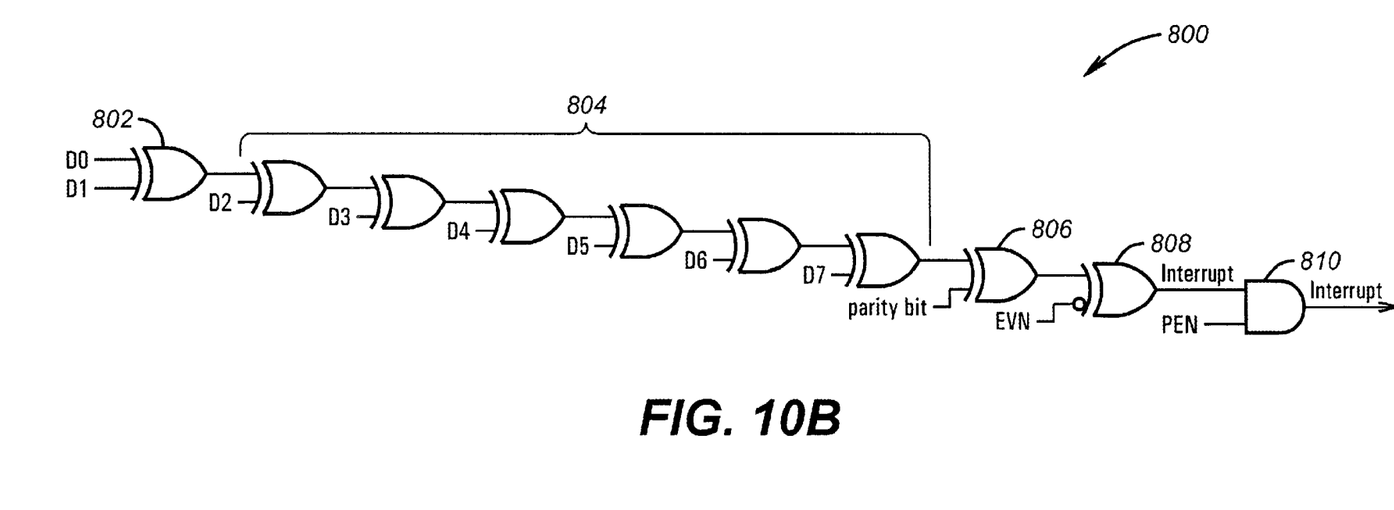

Turning now to FIGS. 10A and 10B, logic is shown for generating interrupts based on the parity bit 326. In frames where the parity bit 326 immediately follows a last data bit 324, the parity bit 326, once detected, can automatically trigger interrupts, for example on a transmission error. FIG. 10A shows the overall interrupt generate block 822 having inputs of the aligned data rxst_data [7:0], the aligned status bits including the parity bit 326, the even parity enable signal EVN 512 and the parity enable signal PEN 508. The interrupt generate block 822 generates an outgoing interrupt signal automatically, without the need for software, to be sent to the appropriate device, for example the interrupt controller 108.

The logic of the interrupt generate block 822 is shown in more detail in FIG. 8B. The logic consists, generally, of a cascade of exclusive OR bits which sequentially compares each bit in the received frame to the output of the last bit comparison. The cascade begins at XOR gate 802 where it receives the first two data bits received on rxst_data[7:0], D0 and D1. The output of XOR gate 802 will be true when D0 and D1 have different values. Alternatively, the output will be false when D0 and D1 have the same value. The output of the first XOR gate 802 is then fed to the next XOR gate in the sequence, which also receives the next data bit in the sequence, D2. This continues down the cascade of XOR gates 804 until the last data bit is input into an XOR gate. The output of this XOR gate is fed as an input to the next XOR gate 806, which also receives the value of the parity bit. Therefore, the XOR gate compares the value of the received parity bit 326 with the cumulative result of the cascaded comparisons through XOR gates 802 and 804. XOR gate 808 receives the output of XOR gate 806 along with the inverted value of the EVN signal 512. The even signal 512 tells the interrupt generate block 822 whether the received frame is configured for either even parity or odd parity. If even parity is selected, the output of XOR gate 806 is false or zero where no parity type communication errors have occurred. In such an event, the output of the XOR gate 806 and the inverted EVN signal 512 has a value of zero, creating an output of the XOR gate 808 of false or zero. However, if a parity type error has occurred on the received frame, the output of the XOR gate 806 is a value of one while the inverted value of the EVN signal 512 is zero. In this case, since the inputs have different values, the XOR gate 808 outputs a value of one. Similar logic exists where odd parity has been selected, except that the output of the XOR gate 806 is true or one where no parity type communication errors have occurred and is false or zero where a parity error has been detected. Therefore, if a parity type error has occurred in the receive transmission frame, the interrupt signal has a value of one. This interrupt signal is then passed through AND gate 810 if the parity enable signal PEN 508 is asserted.

Thus, a system according to the present invention provides an asynchronous serial port which supports automatic parity generation and detection for communication frames employing address bits. In the disclosed embodiment, the communication frames are specified by a 7- or 8-data bit protocol. By placing the parity bit directly following a last data bit, parity generation does not require dedicated software. The foregoing system also provides parity generation and detection protocol which is not dependent on data frame length. Finally, an asynchronous serial port according to the present invention provides automatic interrupt generation directly off the parity bit.

It should be understood that an asynchronous serial port in accordance with the present invention may include transmitter logic and receiver logic typical of an asynchronous serial port. Further, it should be understood that ways for generating and detecting a parity bit directly following a last data bit other than described herein are possible without departing from the spirit of the invention.

The foregoing disclosure and description of the invention are illustrative and explanatory thereof, and various changes in the details of the illustrated apparatus and construction and method of operation may be made without departing from the spirit of the invention.

We claim:

1. A microcontroller, comprising:

an execution unit for executing instructions; and an asynchronous serial port coupled to the execution unit for communicating asynchronous frames, a frame including start bits, data bits, parity bits, address bits and stop bits, the asynchronous serial port being selectively configured to generate and detect a frame including a parity bit selectably located directly following a last data bit and preceding an address bit or directly following an address bit.

2. The microcontroller of claim 1, wherein the parity bit is generated and detected independently of the address bit.

3. The microcontroller of claim 1, wherein a communication error is indicated by a value of the parity bit, an interrupt is generated to the execution unit.

4. The microcontroller of claim 1, wherein when a communication error is indicated by a value of the parity bit, an interrupt is automatically generated from the parity bit to the execution unit.

5. The microcontroller of claim 1, the asynchronous serial port comprising:

a transmitter for generating the parity bit.

6. The microcontroller of claim 1, the asynchronous serial port comprising:

a receiver for detecting the parity bit.

7. The microcontroller of claim 1, wherein the frame comprises eight data bits followed by the parity bit preceding the address bit.

8. The microcontroller of claim 1, wherein the frame comprises seven data bits followed by the parity bit preceding an address bit.

9. The microcontroller of claim 1, wherein the frame comprises a start bit followed by a predetermined number of data bits followed by the parity bit followed by an address bit followed by a predetermined number of stop bits.

10. The microcontroller of claim 1, the asynchronous serial port comprising: control register having a early parity enable bit for enabling generation and detection of the parity bit prior to the address bit.

11. An asynchronous serial port for communicating asynchronous frames, a frame including start bits, data bits, parity bits, address bits and stop bits, the asynchronous serial port being configured to generate and detect a frame including a parity bit selectably configured following directly a last data bit or following an address bit, the asynchronous serial port comprising:

a transmitter for generating the parity bit; and a receiver for detecting a parity bit.

12. The asynchronous serial port of claim 11, wherein the parity bit is generated independently of the address bit.

13. The asynchronous serial port of claim 11, wherein when a communication error is indicated by a value of the parity bit, an interrupt generated to an execution unit.

14. The asynchronous serial port of claim 11, wherein when a communication error is indicated by a value of the parity bit, an interrupt is automatically generated from the parity bit to the execution unit.

15. The asynchronous serial port of claim 11, wherein the frame comprises eight data bits following by the parity bit preceding the address bit.

16. The asynchronous serial port of claim 11, wherein the frame comprises seven data bits followed by the parity bit preceding the address bit.

17. The asynchronous serial port of claim 11, wherein the frame comprises a start bit followed by a predetermined number of data bits followed by the parity bit followed by the address bit followed by a predetermined number of stop bits.

18. The asynchronous serial port of claim 11, the asynchronous serial port comprising; control register having an early parity enable bit for generating and detecting the parity bit prior to the address bit.

19. The asynchronous serial port of claim 11, wherein the parity bit is generated in a bit location following a last data bit location.

20. A method of automatic parity generation in an asynchronous serial port supporting address bits, comprising the steps of:

generating a parity bit in a selectable location immediately following a last data bit and preceding an address bit within a frame or directly following an address bit; and generating an address bit according to the selected parity location.

21. The method of claim 20, the step of generating a parity bit comprising the step of:

selecting the location of the parity bit.

22. The method of claim 20, the step of generating a parity bit comprising the step of:

placing the parity bit as the eighth bit in frames having seven data bits, when the selected parity bit location is immediately following a last data bit.

23. The method of claim 20, the step of generating a parity bit comprising the step of:

placing the parity bit as the ninth bit in frames having eight data bits, when the selected parity bit location is immediately following a last data bit.

24. The method of claim 20, the step of generating a parity bit comprising the step of:

placing the parity bit after the address bit when the selected parity bit location is following the address bit.

25. A method of automatic parity detection in an asynchronous serial port supporting address bits, comprising the steps of:

detecting a parity bit in a selectable location immediately following a last data bit and preceding an address bit within a frame or directly following an address bit; and detecting an address bit according to the selected parity bit location.

26. The method of claim 25, the step of detecting a parity bit comprising the step of:

detecting the parity bit as the eighth bit in frames having seven data bits, when the selected parity bit location is immediately following a last data bit.

27. The method of claim 25, the step of receiving a parity bit comprising the step of:

detecting the parity bit as the eighth bit in frames having seven data bits, when the selected parity bit location is immediately following a last data bit.

28. The method of claim 25, the step of receiving a parity bit comprising the step of:

detecting the parity bit as the ninth bit in frames having eight data bits, when the selected parity bit location is immediately following a last data bit.

29. The method of claim 25, further comprising the step of:

generating an interrupt when a communication error is indicated by a value of the parity bit.

30. An asynchronous serial port adapted for automatic parity support for frames with address bits, comprising:

a transmitter means for generating a frame with a parity bit selectably located directly following a last data bit and preceding an address bit or directly following an address bit; and a receiver means for detecting a frame with a parity bit selectably located directly following a last data bit or following an address bit.

31. The asynchronous serial port of claim 30, further comprising:

an interrupt means for generating an interrupt signal based on a value of the parity bit.

* * * * *